Feb. 26, 1957 P. RAIBOURN 2,783,300

FILM RECORDING FROM TELEVISION RECEIVER CATHODE RAY TUBE

Filed May 18, 1950

INVENTOR
PAUL RAIBOURN
BY Darby & Darby
ATTORNEYS

United States Patent Office 2,783,300
Patented Feb. 26, 1957

2,783,300

FILM RECORDING FROM TELEVISION RECEIVER CATHODE RAY TUBE

Paul Raibourn, Southport, Conn.

Application May 18, 1950, Serial No. 162,665
11 Claims. (Cl. 178—7.4)

Figure 1:
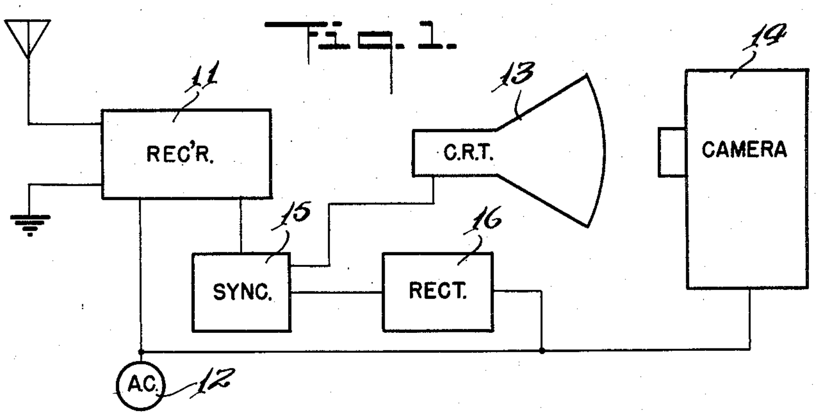

One of the major problems in recording television images on film has been created because of the difference in frame frequencies of television and motion pictures. In accordance with present standards of the Federal Communications Commission, television operates at 30 frames per second. The standard motion picture frame rate is 24 frames per second.

In copending application Serial No. 778,307, now Patent No. 2,716,154, there is disclosed and claimed an all electronic system which may be termed as electronic shutter. In accordance with the system disclosed and claimed, the synchronizing pulses available in the television receiver are utilized to control a number of individual circuits to produce square wave pulses which, when applied to the cathode ray tube of the television receiver, will periodically blank out or cut off the image presented thereby. The synchronizing pulses are counted to produce triggering pulses occurring at a 24 cycle rate corresponding to the frame rate of operation of the motion picture film.

The synchronizing pulses pass through a gating circuit which passes only a number of pulses corresponding to a complete television frame. This gating circuit is controlled in turn by a second triggering circuit operating at 24 cycles per second. This latter triggering circuit is controlled by the synchronizing pulses of the television receiver by passing such pulses through a frequency divider circuit to produce pulses at 24 cycles per second. The same synchronizing pulses may be used to operate the camera by utilizing such pulses to operate an inverter circuit to provide A. C. power therefor. In this way, complete synchronization has been obtained for all parts involved in the system.

The present invention is a modification and improvement over the system disclosed in the above identified copending application. In accordance with the present system, the gating circuit referred to above is controlled by the A. C. power line furnishing power for the television system and the camera. Since the camera and the gating circuit are operated from the same power line, synchronization between the blanking of the cathode ray tube and the camera is assured.

Figure 2:
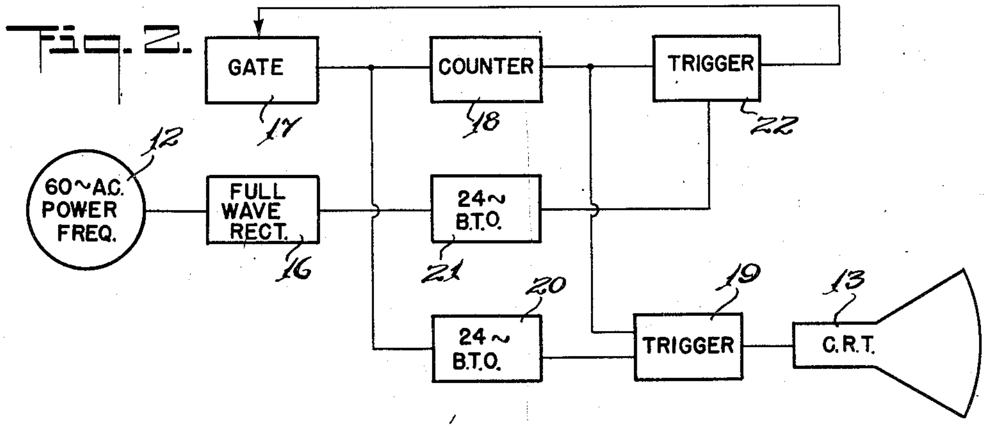
Figure 3:
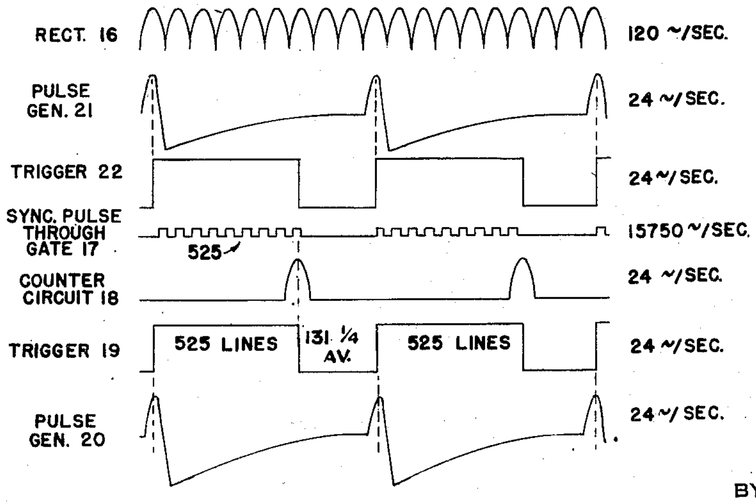

The present invention represents a simplification of the apparatus described in the copending application identified above. The method and apparatus involved will be described more fully hereinafter with particular reference to the drawing, in which:

Figure 1 shows in a block diagram form apparatus for recording television images onto a motion picture film;

Figure 2, again in block diagram form, is a more detailed showing of components and connections in the synchronizing control portion of the apparatus shown in Figure 1; and Figure 3 shows the pulse wave forms from the circuits identified in Figure 2 and their relationship with respect to time.

Present television standards established by the Federal Communications Commission are for transmission of the television signals at a television frame rate of 30 cycles per second or field rate of 60 cycles per second, each frame comprising 525 lines. Accordingly, for the purpose of illustration, the present invention will be described for use in accordance with present television standards. It is to be understood, however, that the apparatus and method disclosed herein is operable equally as well on other television standards, such as for instance, a different number of lines per frame or different frames or fields per second.

With particular reference to Figure 1, it may be seen that the system comprises a normal television receiver 11 having the usual antenna and ground connections and operating from an A. C. power source 12. The signals from the receiver 11 are applied to the cathode ray tube 13 associated therewith, which presents the complete television picture at the rate of 30 frames per second. The image presented on the cathode ray tube 13 is photographed onto a film in the motion picture camera 14, which camera operates the film at a frame rate of 24 cycles per second. The camera 14 derives its power from the same A. C. power source 12.

The cathode ray tube 13 is blanked periodically at the 24 cycle rate to cut off the entire image for a short time, during which time the film in the camera 14 is in movement. Such blanking of the tube 13 is controlled by pulses derived from the synchronizing control circuit 15 connected to the receiver 11 and the cathode ray tube 13. A full wave rectifier 16 is connected between the power source 12 and the synchronizing control circuit 15 to provide rectified sinusoidal waves at 120 cycles per second.

The control circuit 15 may be described more fully by reference to Figure 2. A gating circuit 17 of well known type, such as disclosed on page 412 of the publication "Principles of Television Engineering," by Fink, published by McGraw-Hill in 1940, is connected to receive the horizontal synchronizing pulses in the television receiver 11. These pulses occur at the normal horizontal frequency rate of 15,750 pulses per second. These pulses control the 525 lines present in a single television frame. This gating circuit 17 is adjusted according to known principles to permit 525 pulses to pass therethrough and then cut off or block further signals until again triggered.

The output from the gating circuit 17 is connected to a frequency counter circuit 18 of well known type, as disclosed in the July 1945 issue of "Electronic Industries," for instance. The counter circuit 18 provides a single pulse output for 525 horizontal synchronizing pulses which output pulses are fed by suitable connection to a trigger circuit 19.

Trigger circuit 19 is like the others, in itself well known, as illustrated for instance, on page 171, paragraph 4.4 of the book "Ultra High Frequency Techniques" by Brainard et al., published by D. Van Nostrand in 1942. Such a circuit remains in a steady state condition until a pulse is received, at which time it "flip-flops" as the potentials therein are reversed, until a second pulse is received. The circuit then returns to its original steady state position. In this way, square wave pulses are obtained having a duration dependent upon reception of triggering pulses. Thus the output of the trigger circuit 19 may be connected to the cathode ray tube to periodically blank the image presented by a suitable bias provided by the square wave pulse. A pulse, to operate the trigger circuit 19 and restore the image in the cathode ray tube, is derived from a pulse generator circuit 20. This pulse generator circuit 20 is preferably a well known blocking tube oscillator type as illustrated, for instance, on page 155 of the Fink book, referred to above. The blocking tube oscillator 20 is adjusted in accordance with well known principles to provide pulses occurring at 24 cycles per second. The triggering voltage, to excite the pulse circuit 20, is derived from the synchronizing pulses passed by the gating circuit 17 by means of suitable connection thereto.

The full wave rectifier 16 provides 120 cycle waves which are fed to another pulse generating circuit 21. This second pulse generating circuit 21 again preferably is a blocking tube oscillator of the type previously described. This second oscillator 21 likewise provides pulses at 24 cycles per second and is triggered by the output from the rectifier 16.

A second triggering circuit 22 which may be of the same type as the hereinbefore described triggering circuit 19, provides the control for the gating circuit 17 so that this gating circuit operates at 24 cycles per second. The initial triggering pulse for the triggering circuit 22 is derived from the blocking tube oscillator 21. The second triggering control pulse is derived from the counter circuit 18. As explained, both of these control circuits are operating at 24 cycles per second, but are spaced in time by virtue of the counting action of the counter circuit 18.

The operation of the circuits described, is as follows.

Power from the 60 cycle power line rectified by the full wave rectifier 16, triggers the blocking tube oscillator or pulse generator 21. The pulse from the generator 21 is applied to the trigger circuit 22 which in turn triggers the gating circuit 17. The gating circuit 17 permits horizontal synchronizing pulses from the television receiver, equivalent to 525 lines, to pass. The first of these pulses triggers the blocking tube oscillator 20 which in turn initiates the operation of the trigger circuit 19. Trigger circuit 19 operates to remove the bias on the cathode ray tube 13 to present a television picture.

The pulse passed by the gating circuit 17 are also applied to the counter circuit 18. The counter circuit 18 produces a single pulse at the end of a number of horizontal synchronizing pulses corresponding to 525 lines. This single pulse output from the counter circuit 18 also is applied to the trigger circuit 19 which then flip-flops to restore the bias on the cathode ray tube 13. Thus a complete television frame of 525 lines has been presented on the tube.

During this time the film in the camera 14 has been stationary. When the trigger circuit 19 restores the bias in the cathode ray tube 13, the television image is blanked out. During this blank out time, the film in the camera 14 is in movement.

The pulse output from the counter circuit 18 also is applied to the trigger circuit 22 and the resulting flip-flop operates on the gating circuit 17 so that the gate is cut off and the horizontal synchronizing pulses from the receiver are not passed therethrough.

Since the pulse generator circuit 21 operates at 24 cycles per second, constituting the motion picture frame rate, the trigger circuit 22 triggers the gating circuit 17 at 24 cycles per second. Thus the horizontal pulses for 525 television lines are permitted to pass the gate 17 at a 24 cycle per second rate. If 525 lines are presented on a 24 cycle per second rate on the tube 13, there will be a blank out time equivalent to 131¼ horizontal television lines. In actual practice this timing varies between 131 and 132 lines, with an average time of 131¼. Thus complete television images are presented by virtue of the 525 line excitation of the screen, but these complete images are blanked at a 24 cycle per second rate corresponding to the motion picture film frame rate, and a portion of the image corresponding to 131¼ lines is blanked at this same rate. Thus the original television frame rate of 30 cycles per second has in effect been varied to 24 cycles per second, but each frame constitutes a complete television picture, constituting 525 horizontal lines.

The time relationship of the various pulses from each of the pulse circuits described is shown in Figure 3. As may be seen, the pulses from the blocking tube oscillator circuits 20 and 21 are the first to be applied to the two trigger circuits 19 and 22 respectively, while the pulse from the counter circuit 18 follows by a time corresponding to 525 horizontal television lines.

As well understood by those skilled in the art, if such an electronic shutter system is used with the cathode ray tube 13, such a tube should have a fluorescent screen having a short persistence characteristic. Preferably this screen should have a decay time to a point below film inertia which is less than 9 microseconds or the television signal horizontal blanking time, whichever is shorter.

While the particular circuits shown and described are those preferred, it will be apparent to those skilled in the art that other circuits or components may be suitable. Thus, modifications may be made without departing from the scope of the invention.

What is claimed is:

1. Apparatus for recording a television image on a motion picture film operating at a predetermined frame rate coordinated to a source of alternating power, comprising a television receiver responsive to a received television signal including synchronizing pulses for reproducing an image, means for blanking the image reproduced by said receiver, a counter circuit connected to said receiver and activated by the synchronizing pulses received thereby to produce a single pulse for a plurality of synchronizing pulses constituting a complete television picture frame, said counter being connected to said blanking means to control said blanking means by said single pulses, and a pulse generating circuit connected to said source of alternating power for producing pulses at said motion picture film frame rate, said pulse circuit being connected to control the recurrent counting cycle of said counter circuit, whereby said image is blanked at said motion picture frame rate for a period of time less than that of a television frame.

2. Apparatus for recording television images on a motion picture film operating at a predetermined motion picture frame rate coordinated with a source of alternating power, comprising a television receiver responsive to a received television signal including synchronizing pulses and having a cathode ray tube for reproducing said images, an electronic counter circuit connected to said receiver and activated by the synchronizing pulses received thereby to produce a single pulse for a plurality of synchronizing pulses constituting a complete television picture frame, a pulse circuit connected to said source of alternating power to be triggered thereby and generate pulses at said predetermined motion picture frame rate, said pulse circuit being also connected to control the recurrent counting cycle of said counter circuit, and an electronic pulse generator connected to said cathode ray tube and to said counter circuit and activated by the output therefrom to produce a signal for blanking out the television image on said tube periodically at the motion picture frame rate for a period of time less than that of one television picture frame.

3. In a system for recording a television image on a motion picture film operating at a predetermined motion picture frame frequency coordinated with a source of alternating power, apparatus comprising in combination a television receiver responsive to a received television signal including synchronizing pulses for reproducing an image, a counter circuit connected to receive television synchronizing pulses from said receiver and generating a single pulse after a plurality of television synchronizing pulses constituting a television picture frame, a pulse generating circuit connected to receive television synchronizing pulses from said receiver and producing pulses at a frequency equal to the frame frequency of said motion picture film, a square wave generator connected to each of said circuits and activated by the output of each thereof and producing a signal periodically at the motion picture frame rate having a duration less than that of a television picture frame for blanking out the image reproduced by said television receiver, and a pulse generator circuit connected to said source of alternating power to be triggered thereby and provide pulses at said predetermined frame frequency, said pulse circuit being also connected to control the recurrent counting cycle of said counter circuit.

4. Apparatus for varying the recurrent rate of reproduction of television images comprising a receiver having means for reproducing said images, said receiver being a first source of control pulses, an electronic counter circuit connected to said receiver and actuated by the synchronizing pulses received thereby to produce a single pulse for a plurality of synchronizing pulses constituting a complete television frame, an electronic pulse generator connected to and activated by the output of said counter circuit and connected also to said means to blank out said images periodically for a period of time less than that of one television frame, a second source of electrical pulses occurring at a rate different from that of said first source, and a pulse generating circuit connected to said second source providing pulses at the new desired recurrent rate of reproduction of said images, said pulse circuit being connected to control the recurrent counting cycle of said counter circuit.

5. Apparatus for recording a television image on a motion picture film operating at a predetermined frame frequency, comprising in combination a television receiver having a cathode ray tube, a gating circuit connected to said receiver for selecting a portion of the horizontal synchronizing pulses received thereby, a pulse counter circuit connected to said gating circuit for generating a single pulse after a plurality of pulses constituting a television picture frame, a second pulse producing circuit connected to and activated by the television synchronizing pulses passed by said gating circuit for producing pulses of a frequency equal to the frame frequency of said motion picture film, a trigger circuit connected to said tube and also connected to and controlled by said pulse counter circuit and said second pulse producing circuit and generating pulses for periodically blanking out the image of said cathode ray tube, a source of power for said receiver and for operation of said motion picture film, and a third pulse producing circuit connected to said power source to be triggered thereby and providing pulses at said predetermined frame rate, and a second trigger circuit connected to and activating said gating circuit at a frequency corresponding to the frame frequency of said motion picture film, said third pulse circuit being connected to control said second trigger circuit.

6. In a system for recording a television image on a motion picture film, apparatus comprising in combination, a television receiver, means for blanking out the television image, a pulse generating electronic circuit connected to said receiver and activated by the first of a series of pulses equal in number to the synchronizing pulses constituting a television frame received by said receiver, and a second pulse generating electronic circuit connected to said receiver and producing a pulse at the time of the last of said series of pulses, said first and second electronic circuits being connected to and controlling said blanking means, a source of power for operating said film, and a third pulse generating circuit connected to said source and to said second pulse generating circuit.

7. Apparatus for synchronizing the elements of a television photographic system which comprises a receiver having a cathode ray tube, a gating circuit connected thereto for passing a number of television synchronizing pulses corresponding to a television frame, a first pulse generating circuit connected to said gating circuit and triggered by the first of said television synchronizing pulses passed thereby, a counter circuit connected to said gating circuit and generating a single pulse at the end of a predetermined number of synchronizing pulses constituting a television frame, a circuit for controlling the excitation of said cathode ray tube, said circuit being connected to and activated by the output of said first pulse generating circuit and connected to and deactivated by the output of said counter circuit, a power source for said system and a second pulse generating circuit connected to said source and coupled to said gating circuit to control the operating rate thereof.

8. Apparatus for varying the recurrent rate of reproduction of a complex signal originally transmitted at a given recurrent rate and having periodic control pulses, comprising means for receiving said signal, a reproducing circuit, a first electronic pulse producing circuit connected to said means to be activated by said periodic pulses, an electronic counter circuit connected to said means to count said periodic pulses and generate new pulses at a different predetermined and desired frequency, a source of additional electric pulses, a second pulse generating circuit connected to said source and producing pulses at said different predetermined and desired frequency and also connected to control the periodic counting cycle of said counter circuit, and a third electronic pulse producing circuit connected to and activated by said first circuit and also connected to and having an output of electrical energy having a duration determined and controlled by said counter circuit, said third circuit being connected also to said reproducing circuit to vary the excitation thereof and thereby vary the recurrent rate of reproduction of said complex signal.

9. In a system for recording a television image on a motion picture film, apparatus comprising in combination a television receiver, means for blanking out the television image, a pulse generating electronic circuit connected to said receiver and activated by the first of a series of pulses equal in number to the synchronizing pulses constituting a television frame received by said receiver, and a second pulse generating electronic circuit connected to said receiver and producing a pulse at the time of the last of said series of pulses, a camera for said film, a power source for said receiver and said camera, and a third pulse generating circuit connected to said source and also coupled to said second pulse circuit to control the timing of the operation thereof.

10. The method of synchronizing the television image reproduction rate with film movement in a television photographic system having means to control the excitation of the cathode ray tube presenting said image which consists in utilizing the electrical power for said system to control the movement of said film, generating control pulses at the rate of movement of said film, utilizing said power to control the generation of said control pulses, selecting the synchronizing signals of the television signal during the period that the motion picture film is stationary, rejecting said synchronizing signals during the period said motion picture film is in motion between motion picture frames, counting said synchronizing pulses, utilizing said control pulses to time the counting cycle, utilizing the first of said synchronizing pulses which have been counted to control the time of excitation of the television cathode ray tube to present a complete television frame signal image, generating a second control signal after a plurality of synchronizing signals constituting a television frame have been counted, and utilizing said second control signal to control the time of blanking said tube and prevent excitation thereof, thereby to cause said tube to present a television signal image during the period the motion picture film is stationary and blank out said tube during the period said film is moving between frames.

11. In a system for recording a television image on a film in a motion picture camera, the method of synchronizing the presentation and blanking of said television image with the movement of said film which consists in selecting the horizontal synchronizing pulses of the television system, counting said pulses, generating a single pulse after counting a plurality of pulses constituting a television frame, applying said generated pulse to the cathode ray tube to control blanking thereof, utilizing a portion of the electric power for said camera to trigger the generation of control pulses at the rate of movement of said film, and utilizing said control pulses to time the counting cycle.

References Cited in the file of this patent

UNITED STATES PATENTS

| | | |
|---|---|---|
| 1,979,484 | Mathes | Nov. 6, 1934 |
| 2,251,786 | Epstein | Aug. 5, 1941 |
| 2,275,898 | Goldsmith | Mar. 10, 1942 |
| 2,373,114 | Goldsmith | Apr. 10, 1945 |
| 2,404,839 | Hammand | July 30, 1946 |
| 2,430,547 | Anderson | Nov. 11, 1947 |
| 2,468,256 | Eskley | Apr. 26, 1949 |
| 2,486,717 | Maurer et al. | Nov. 1, 1949 |
| 2,565,366 | Gray | Aug. 21, 1951 |
| 2,595,397 | Lee et al. | May 6, 1952 |
| 2,604,535 | Garman | July 22, 1952 |